United States Patent
Biessmann et al.

(10) Patent No.: US 9,892,133 B1
(45) Date of Patent: Feb. 13, 2018

(54) VERIFYING ITEM ATTRIBUTES USING ARTIFICIAL INTELLIGENCE

(71) Applicant: Amazon Technologies, Inc., Seattle, WA (US)

(72) Inventors: Felix Biessmann, Berlin (DE); Cédric Philippe Charles Jean Ghislain Archambeau, Berlin (DE); Charles Shearer Dorner, Seattle, WA (US); Karl Anders Gyllstrom, Seattle, WA (US); Robert Yuji Haitani, Seattle, WA (US); Aengus Gabriel Martin, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 124 days.

(21) Appl. No.: 14/658,042

(22) Filed: Mar. 13, 2015

Related U.S. Application Data (60) Provisional application No. 62/116,247, filed on Feb. 13, 2015.

(51) Int. Cl.
*G06K 9/62* (2006.01)
*G06F 17/30* (2006.01)
*G06N 99/00* (2010.01)
*G06N 5/04* (2006.01)

(52) U.S. Cl.
CPC .... *G06F 17/30256* (2013.01); *G06F 17/3025* (2013.01); *G06F 17/30262* (2013.01); *G06K 9/6262* (2013.01); *G06N 5/04* (2013.01); *G06N 99/005* (2013.01)

(58) Field of Classification Search
None
See application file for complete search history.

(56) References Cited

U.S. PATENT DOCUMENTS

| | | | |
|---|---|---|---|
| 2003/0113017 A1* | 6/2003 | Thomas | G06F 17/30256 382/181 |
| 2012/0117072 A1 | 5/2012 | Gokturk et al. | |
| 2012/0183224 A1* | 7/2012 | Kirsch | G06K 9/4619 382/195 |

OTHER PUBLICATIONS

Bergstra et al., Random Search for Hyper-Parameter Optimization, Journal of Machine Learning Research, vol. 13, pp. 281-305, 2012.
Dalal et al., Histograms of Oriented Gradients for Human Detection, International Conference on Computer Vision and Pattern Recognition (CVPR '05), Jun. 2005. IEEE Computer Society, 1 pp. 886-893, 2005.

(Continued)

*Primary Examiner* — Mark Roz
(74) *Attorney, Agent, or Firm* — Knobbe Martens Olson & Bear LLP (57) ABSTRACT

A system that verifies the attributes included in the description of an item using artificial intelligence is provided. For example, the system may use a feature extractor to identify color, shape, and/or texture features of a provided image. The system may then use a linear classifier to process the extracted features to identify attributes of the item depicted in the image. The system may compare the identified attributes with the attributes listed in the item's description. If there are any discrepancies, the system may revise the item description to include the identified attributes or provide suggested revisions to a user based on the identified attributes.

17 Claims, 6 Drawing Sheets

(56) References Cited

OTHER PUBLICATIONS

Haufe et al., On the interpretation of weight vectors of linear models in multivariate neuroimaging, NeuroImage, vol. 87, pp. 96-110, 2014.
Hotelling, Relations Between Two Sets of Variates, Biometrika, vol. 28, No. 3/4, pp. 321-377, Dec. 1936.
Kettenring, Canonical Analysis of Several Sets of Variables, University of North Carolina at Chapel Hill, Institute of Statistics Mimeo Series No. 615, Apr. 1969.
Klami et al., Bayesian Canonical Correlation Analysis, Journal of Machine Learning Research, vol. 14, pp. 965-1003, 2013.
Klami et al., Group-sparse Embeddings in Collective Matrix Factorization, International Conference on Learning Representations, 2014.
Koren et al., Matrix factorization techniques for recommender systems, IEEE Compute Society, pp. 42-49, Aug. 2009.
Muller et al., An Introduction to Kernel-Based Learning Algorithms, IEEE Transactions on Neural Networks, vol. 12, No. 2, pp. 181-201, Mar. 2001.
Rahimi et al., Weighted Sums of Random Kitchen Sinks: Replacing minimization with randomization in learning, NIPS'08 Proceedings of the $21^{st}$ International Conference on Neural Information Processing Systems, Dec. 2008.
Snoek et al., Practical Bayesian Optimization of Machine Learning Algorithms, Aug. 29, 2012.
Tola et al., Daisy: An efficient dense descriptor applied to wide baseline stereo. Pattern Analysis and Machine Intelligence, IEEE Transactions on, 32(5):815-830, 2010.
Tucker, An inter-battery method of factor analysis. Psychometrika, 23(2):111{136, 1958.
Vedaldi et al, Efficient Additive Kernels via Explicit Feature Maps, IEEE Transactions on Pattern Analysis and Machine Intelligence, pp. 1-14, Jun. 2011.
Williams et al., Using the Nyström, Method to Speed up Kernel Machines, Advances in Neural Information Processing Systems 13, Papers from Neural Information Processing Systems (NIPS), Jan. 2000.

* cited by examiner

VERIFYING ITEM ATTRIBUTES USING ARTIFICIAL INTELLIGENCE

CROSS-REFERENCE TO RELATED APPLICATIONS

This application claims priority under 35 U.S.C. § 119(e) to U.S. Provisional Application No. 62/116,247, entitled "VERIFYING ITEM ATTRIBUTES USING ARTIFICIAL INTELLIGENCE" and filed on Feb. 13, 2015, which is hereby incorporated by reference herein in its entirety.

BACKGROUND

Users that list items for viewing by others in a network-accessible system sometimes provide inaccurate or inadequate descriptions of such items. For example, a first user may upload a picture of a pair of black shoes with brown laces. In the description of the item, the first user may indicate that the shoes are dark brown and fail to mention the color of the laces. A second user may wish to view items that are black shoes with brown laces and may enter an appropriate search query into the network-accessible system. However, the search for black shoes with brown laces may not yield the item offered by the first user in the list of results. Furthermore, a third user seeking brown shoes may enter an appropriate search query in the network-accessible system and inaccurately be presented with the item listed by the first user as a result. Thus, without clean and trustworthy descriptions, users may have a difficult time finding relevant items.

BRIEF DESCRIPTION OF THE DRAWINGS

Throughout the drawings, reference numbers may be re-used to indicate correspondence between referenced elements. The drawings are provided to illustrate example embodiments described herein and are not intended to limit the scope of the disclosure.

DETAILED DESCRIPTION

Introduction

As described above, users that wish to list items in a network-accessible system often misidentify the item or inadequately describe the item. For example, such network-accessible systems may include electronic marketplaces that allow multiple different sellers to list items. When creating a listing for an item, a seller may inaccurately or inadequately describe the item. Such issues with the descriptions can reduce the effectiveness of search engines as users searching for a particular item may not come across an offered item even if the item is relevant or may come across items that are not relevant. Thus, without clean and trustworthy descriptions, users seeking items may have a difficult time finding relevant results.

Accordingly, the embodiments described herein provide an attribute verification system for identifying attributes of an item using artificial intelligence and determining whether the identified attributes are included in a description of the item on a network-accessible system. The attribute verification system may identify the attributes based on an image depicting the item that is provided by the user (e.g., a vendor, merchant, customer, etc.) or that is otherwise included in a database accessible by the network-accessible system. For example, the systems and methods described herein may use artificial intelligence, such as statistical or machine learning models (e.g., linear classifiers, logistic regression classifiers, latent variable models, etc.), to identify the attributes from the provided image. The model may be trained on a set of images that depict one or more items. Some images may be annotated or labeled such that attributes and/or locations of the attributes are indicated in the image. The labels may correspond to the image as a whole and/or to a portion of the image. Using these images, the model may be trained to identify attributes of an item when presented with the image. The training may include using feature engineering (e.g., face recognition technology) to identify the portion or portions of an image to which a label corresponds. Other images may not be annotated or labeled. These images may be used to train a latent variable model that can be used to identify similar items based on identified attributes. For simplicity, the attribute verification system is described herein with reference to linear models; however, this is not meant to be limiting. The attribute verification system described herein can be implemented using other types of artificial intelligence or statistical or machine learning models.

The attribute verification system may extract features (e.g., feature vectors) from the provided image using various image processing techniques (e.g., computer vision image processing techniques). Such features may include image color features, global shape (or silhouette) features, and/or texture features. The attribute verification system may use the linear classifier to analyze the extracted features. Based on an analysis of the extracted features, the linear classifier may output one or more attributes determined to be associated with the provided image.

The attribute verification system may identify attributes in a variety of contexts. For example, a listing for an item may already be present in the network-accessible system. The attribute verification system may be used to evaluate the accuracy and adequateness of the item description provided by a user. Features may be extracted from an image present in the listing and analyzed by the linear classifier. Upon receiving the list of possible attributes of the item in the image from the linear classifier, the attribute verification system may compare the attributes provided in the item description with the attributes outputted by the linear classifier. The attribute verification system may identify attributes that conflict (e.g., the attributes provided in the item description may state that a dress is black, whereas the attributes outputted by the linear classifier may state that a dress is brown) and attributes outputted by the linear classifier that are not present in the attributes provided in the item description. The attribute verification system may use these results to validate (e.g., if there are no conflicts and no missing attributes) or invalidate (e.g., if there are conflicts or missing attributes) the user's description. Alternatively or in addition, the attribute verification system may present to the user associated with the listing an indication of which attributes conflict (and a suggested correction based on the attributes outputted by the linear classifier), if any, and which attributes are missing (based on the attributes outputted by the linear classifier), if any. In some embodiments, the user may be asked to provide confirmation on whether the suggestions are acceptable. The feedback provided by the user may be used to update the training of the linear classifier. In other embodiments, the attribute verification system may auto-correct the item description provided by the user using some or all of the attributes outputted by the linear classifier without requesting a confirmation or verification of the identified attributes from the user.

As another example, a user may upload an image to the network-accessible system. Upon receiving the image, the attribute verification system may extract features from the image and analyze the features using the linear classifier. In some embodiments, the user may receive a listing of one or more suggested attributes outputted by the linear classifier. The user can provide feedback to the attribute verification system identifying which suggested attributes are correct and which suggested attributes are incorrect. Such feedback may be used to update the training of the linear classifier.

As another example, the attribute verification could be offered as a service that is not part of a marketplace listing system (e.g., the network-accessible system). A third party could provide an image to the attribute verification system and receive a list of attributes using any of the processes described above. The third party may use the list of attributes for any number of purposes. For example, the third party may include the attributes in an article that reviews the item in the image. As another example, the third party may use the service to identify an item and the item's features in an otherwise unlabeled image.

In further embodiments, the attribute verification system provides the user with one or more items that may be related to an item that the user is currently viewing. For example, a user may identify an item that is of interest, but may wish to search for similar items (e.g., other items that have similar colors, shapes, and/or textures). The attribute verification system may use the latent variable model and the features extracted from an image to generate a representation of an item in the image. The attribute verification system may repeat this process for some or all of the items in a catalog. The attribute verification system may store the representations in a lower dimensional space such that the representations of items with similar colors, shapes, and/or textures are stored near each other. Once a user selects a first item, the attribute verification system may parse the lower dimensional space to identify other items that have representations that neighbor the representation of the first item. The attribute verification system may present these other items to the user as items that are similar to the first item.

Attributes can include features of an item. For example, if the item is a piece of clothing, the features may include neckline (e.g., V-neck, crew, halter, scoop, boat, off shoulder, strapless, one shoulder, turtleneck, sweetheart, keyhole, square, straight, collared, round, etc.), hemline (e.g., above the knee, below the knee, ankle, cropped, asymmetrical, etc.), shape (e.g., A-line, empire, sheath, wrap-around, bubble, fishtail, etc.), fabric (e.g., velvet, silk, cotton, polyester, nylon, chiffon, georgette, net, satin, lace, denim, fur, faux fur, felt, linen, fleece, flannel, wool, etc.), sleeve type (e.g., capped sleeves, sleeveless, spaghetti strap, ¾ length, long sleeves, short sleeves, etc.), embellishments (e.g., buttons, jewels, sashes, glitter, etc.), method of closure (e.g., zipper, buttons, eye hook, etc.), pattern (e.g., houndstooth, polka dot, stripes, plaid, solid, etc.), stitching (e.g., cross-stitch, embroidery, etc.), and/or the like.

System Components

Figure 1A:
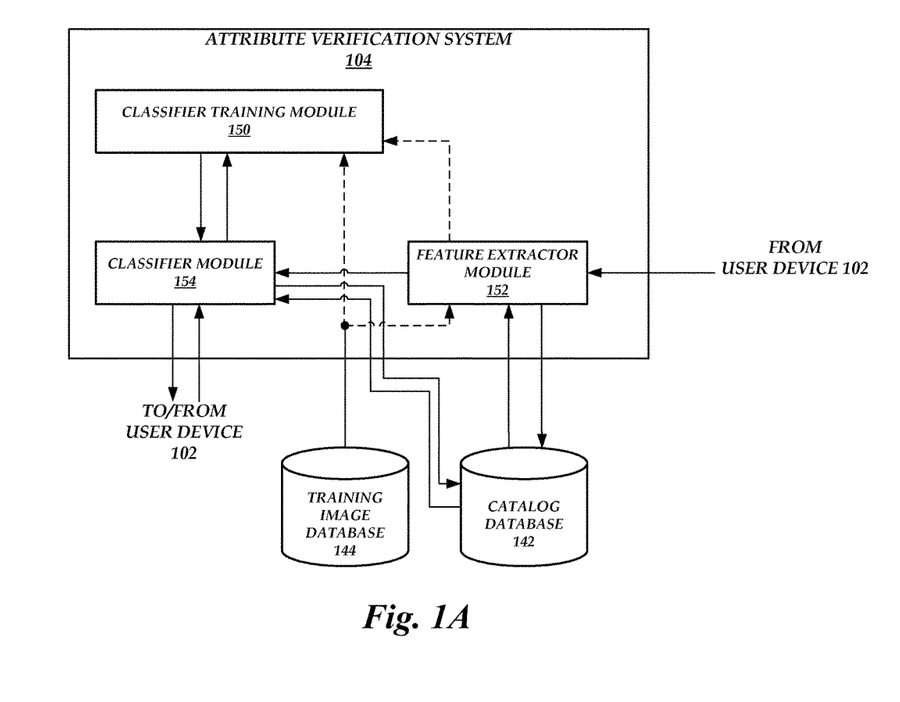
FIG. 1A illustrates various blocks in a catalog item attribute verification system that can be used to verify the attributes of an item.

FIG. 1A illustrates various blocks in a catalog item attribute verification system 104 that can be used to verify the attributes of an item. The attribute verification system 104 may perform two main operations: train the linear classifier and/or latent variable model and identify attributes in images.

Training the Linear Classifier and/or the Latent Variable Model

In an embodiment, a training image database 144 stores images that can be used to train the linear classifier. At least some of the images in the training image database 144 may include annotations or labels. These images may be used to train a linear classifier. For example, one or more labels may be associated with an image such that the labels indicate attributes and/or locations of the attributes in the image. The labels may correspond to the image as a whole and/or to a portion of the image. In one example, if the item is clothing, one label may identify the type of neckline of the piece of clothing, which corresponds to a portion of the image (e.g., the area of the piece of clothing where the neckline exists). In another example, if the item is clothing, one label may identify the color of the clothing, which corresponds to the whole image. Other images in the training image database 144 may not include annotations or labels. These images may be used to train a latent variable model.

The images in the training image database 144 may include items that are positioned in variety of poses and in which different camera angles are used (e.g., such that multiple images may depict a single item from different views and angles). The images may also be cropped and scaled in different ways. Some images may include backgrounds that are pure white and some images may include backgrounds that are not pure white. In addition, some of the images in the training image database 144 may be used as ambiguous examples. For example, an image may be associated with a pattern label only because a portion of the item depicted in the image includes the labeled pattern (rather than the entire item).

The training image database 144 may organize images such that they are associated with attributes of specific items. The training image database 144 may also include positive and negative samples associated with an attribute of a specific item. For example, a positive sample may be an image that includes a label identifying a specific attribute in the image. A negative sample may be an image that includes a label stating that the image is not or does not include the specific attribute.

The training image database 144 may be located external to the attribute verification system 104, such as on a separate system or server. The attribute verification system 104 may include a classifier training module 150 that trains the linear classifier based on the images stored in the training image database 144 (e.g., the images that are annotated or labeled). The attribute verification system 104 may also include a feature extractor module 152 and a classifier module 154. The feature extractor module 152 may extract color, shape, and/or texture features from an image. The classifier module 154 may include a classifier, such as a linear classifier, used to identify attributes in images that depict an item. Thus, the classifier training module 150 may train the linear classifier in the classifier module 154.

In an embodiment, in a supervised learning case, the classifier training module 150 trains the linear classifier using some or all of the images stored in the training image database 144 (e.g., the images that are annotated or labeled). For example, the classifier training module 150 may train the linear classifier by extracting color, shape, and/or texture features from images in a manner as described below with respect to the feature extractor module 152. Alternatively, the attribute verification system 104 may pass the images to the feature extractor module 152 and the features extracted by the feature extractor module 152 may be sent to the classifier training module 150. The classifier training module 150 may concatenate the color, shape, and/or texture features to generate a feature vector $x \in R^d$, where d is the sum of the dimensionality of color, shape, and texture features, that is used to train a one vs. rest classifier (e.g., a regression classifier). For each class of attributes, the classifier training module 150 may define a label y as equaling 1 for the members of the respective class and y as equaling −1 for members of all other classes. The classifier training module 150 may then generate a weight vector $w \in R^d$ for each class such that a likelihood p(y|w,x) of a correct label is minimized subject to an $L_2$-norm constraint on w. The model used by the classifier training module 150 may be as follows:

$$\underset{w}{\operatorname{argmax}} \frac{1}{1 + e^{-yw^T x}}, s.t. \|w\|_2 < \lambda \quad (1)$$

As described above, some labels associated with an image may correspond to a portion of the image. Accordingly, the classifier training module 150 may use feature engineering (e.g., face recognition technology, other image recognition technology, etc.) to identify the portion of the image to which the label or labels correspond. For example, a label may identify the type of neckline of an item in the image. Face recognition technology may be used to identify a portion of the image that corresponds with the neckline. The classifier training module 150 may then associate the label with the identified portion when completing the training process.

The classifier training module 150 may periodically train the linear classifier. For example, the classifier training module 150 may initially train the linear classifier. As new items, item descriptions, and/or images are provided to the network-accessible system, the classifier module 154 may use the images to identify additional attributes not included in the item descriptions. In some embodiments, the user provides feedback on the output of the classifier module 154 (e.g., whether the identified attributes are actually associated with the item). The feedback may be provided to the classifier training module 150 and/or the image with labels identifying the correct attributes may be stored in the training image database 144. At set intervals (e.g., once a day) or when feedback is provided, the classifier training module 150 can use the feedback to update the training of the linear classifier.

The classifier training module 150 may further train the linear classifier based on images stored in a catalog database 142 and feedback provided by a user. As described below, the catalog database 142 may store listings of items that are available for viewing in the network-accessible system. A user, such as a merchant, vendor, customer, and/or the like, may view an existing listing and determine that the listing fails to mention an attribute of an item depicted in an image. The user can submit an identification of the missing attribute to the network-accessible system, the existing listing can be updated and stored in the catalog database 142 (with, for example, an annotation or label identifying the missing attribute associated with the image), and/or the image and an annotation or label identifying the missing attribute can be stored in the training image database 144. The classifier training module 150 can use the image and an annotation or label identifying the missing attribute (e.g., retrieved from the catalog database 142 or the training image database 144) to further train the linear classifier.

In an unsupervised learning case, the classifier module 154 or a recommendation module in the attribute verification system 104 (not shown) may further include a latent variable model, and the classifier training module 150 may train the latent variable model using some or all of the images stored in the training image database 144 (e.g., the images that are not annotated or labeled). As described below, the latent variable model can be used to identify items that are similar to an item selected by the user. It may not be necessary to annotate or label the images used to train the latent variable model because the latent variable model may not use a name associated with a given attribute to identify similar attributes. Rather, the classifier module 154 or the recommendation module may identify attributes in an item using one or more of the extracted features, generate a representation of the item using a latent variable model, and compare the proximity of representations with each other in a lower dimensional space to identify items that may include similar attributes.

Identifying Attributes in an Image

In an embodiment, a catalog database 142 stores listings of items that are available for viewing in a network-accessible system. The listings may include one or more images and a description of the item. The catalog database 142 may be located external to the attribute verification system 104 and/or the training image database 144, such as on a separate system or server. The catalog database 142 may be operated by the same entity as the entity that operates the network-accessible system and/or the attribute verification system 104, may be operated by an entity related to the entity that operates the network-accessible system and/or the attribute verification system 104, or may be operated by an entity different from the entity that operates the network-accessible system and/or the attribute verification system 104.

The attribute verification system 104 may operate in one of a plurality of scenarios. In a first scenario, the attribute verification system 104, and specifically the feature extractor module 152, may receive an image from a user device 102. The feature extractor module 152 may receive the image from the user device 102 when a user (e.g., a merchant, vendor, customer etc.) associated with the user device 102 uploads the image for an item listing. The user may upload the image for a new listing or an existing listing. A description of the item may also be provided by the user or already exist (e.g., if the listing already exists). Alternatively, the attribute verification system 104, and specifically the feature extractor module 152, may receive an image from a remote system (not shown). For example, the remote system may be a computing device operated by or associated with an administrator, employee, or other staff member associated with the attribute verification system 104 and/or the network-accessible system. The remote system may be at a location (e.g., a fulfillment center) where the administrator, employee, or staff member can take a picture of an item delivered by a user. The picture may then be provided to the attribute verification system 104 for a new listing or an existing listing.

The feature extractor module 152 may extract color, shape, and/or texture features of an item depicted in the image. For example, the feature extractor module 152 may use computer vision image processing or pre-processing techniques to extract the features. Prior to extracting the features, the feature extractor module 152 may normalize the image to a set size (e.g., 500 pixels in height). To extract the color feature (e.g., a vector of colors from the image), the feature extractor module 152 may generate a list of color values (e.g., RGB color triples), with one element in the list for each pixel in the image. Any color values corresponding to pure white (e.g., an RGB value of 0, 0, 0) may be removed from the list because they generally correspond to the background of the image (rather than the item in the image). The feature extractor module 152 may further pare the list to only include every nth element, where n is a parameter of the feature extractor module 152. The list may then be a vector of color values.

Optionally, the feature extractor module 152 may compute a bag-of-visual-words (BoVW) using the vector of color values. The BoVW may refer to a process where image descriptors (e.g., local image statistics, such as DAISY descriptors) extracted from a number of patches or segments in an image are first clustered (e.g., using K-means clustering or a similar technique) to generate a fixed-size vocabulary of descriptors (e.g., visual words). The feature extractor module 152 may assign each patch or segment in the image to its closest cluster center and compute a histogram of cluster centers across all patches or segments in the image, where the x-axis of the histogram represents various color values and the y-axis of the histogram represents a count (e.g., a number of times a color value is present in a patch or segment of the image). The histogram may allow for the comparison of items with non-uniform colors.

Optionally, the feature extractor module 152 may then compute a non-linear transformation, such as a kernel approximation (e.g., a chi-squared kernel approximation), of the computed histogram. Generally, kernel functions may be difficult to compute using relatively large data sets. Thus, approximating kernel functions may allow for kernel functions to be computed using relatively large data sets. The chi-squared kernel approximation may be represented as follows:

$$k(x, y) = \sum_{i=1}^{d} \frac{2x_i y_i}{x_i + y_i} \quad (2)$$

where x refers to values on the x-axis of the histogram and y refers to values on the y-axis of the histogram. The computed kernel approximation may allow for the identification of non-linear dependencies between attributes and labels (e.g., to aid the classifier training module 150 in training the linear classifier). For example, the kernel approximation may project data points to a high-dimensional kernel feature space in which non-linear dependencies become linear dependencies. Thus, non-linear class (e.g., attribute) boundaries may be expressed as linear combinations (e.g., inner products) of data points in the kernel feature space. The computed kernel approximation may represent the color feature.

To extract the shape feature, the feature extractor module 152 may downscale the image (e.g., such that the image is 100 pixels by 100 pixels). The feature extractor module 152 may then compute a histograms of oriented gradients (HOG) using the downscaled image. To compute the HOG, the feature extractor module 152 may divide the image into rectangular blocks of pixels and each block may be further subdivided into rectangular cells. Blocks may overlap so that some cells reside in more than one block. At each pixel, the feature extractor module 152 calculates the gradient (e.g., magnitude and orientation) using, for example, a central difference scheme. The feature extractor module 152 may then generate, for each cell in the image, a histogram of pixel orientations with each bin corresponding to a particular direction from 0 degrees to 180 degrees or 360 degrees. The feature extractor module 152 may then, for each block in the image, normalize the histograms of the component cells. Thus, the shape feature may be a vector that includes the histograms of each cell in each block concatenated together (e.g., such that each element in the vector includes a histogram of a cell in a block). Optionally, the feature extractor module 152 may compute a BoVW using the vector in a manner as described above. Optionally, the feature extractor module 152 may compute a kernel approximation using the BoVW in a manner as described above.

To extract the texture feature, the feature extractor module 152 may use local image statistics (e.g., a DAISY dense feature descriptor). The DAISY dense feature descriptor may capture local image statistics that are invariant with respect to their spatial location and may be based on gradient orientation histograms. For example, the feature extractor module 152 may use the DAISY features to collect weighted sums of orientation gradients by convolving the image repeatedly with isotropic Gaussians of different sizes. The DAISY descriptor may start at a densely sampled grid of center pixels and extract the orientation gradients with increasing spatial scales at locations of increasing distance around the center pixel. The extracted orientation gradients may be the texture feature. Optionally, the feature extractor module 152 may compute a BoVW using the orientation gradients in a manner as described above. Optionally, the feature extractor module 152 may compute a kernel approximation using the BoVW in a manner as described above. The color feature, shape feature, and texture feature may be forwarded to the classifier module 154.

The classifier module 154 may use the extracted color, shape, and/or texture features and the training data provided by the classifier training module 150 to identify attributes of an item depicted in the image. For example, the classifier module 154 may concatenate the color, shape, and/or texture features to generate a feature vector $x \in R^d$, where d is the sum of the dimensionality of color, shape, and texture features. The generated feature vector may be used to identify the attributes of the item depicted in the image. The attributes may be provided as strings and the strings may match or closely match the strings present in the labeled images used to train the linear classifier. The identified attributes may be provided to the user device 102. If the provided image is for a new listing, the classifier module 154 may determine an item category for the item depicted in the image using the outputted attributes. The new listing may automatically be placed within the determined item category. Alternatively, the determined item category may be sent to the user device 102 such that a user can confirm whether the determined item category is accurate.

In a second scenario, the feature extractor module 152 may receive an image from the catalog database 142. The feature extractor module 152 may receive the image upon a request to revise an existing listing (from, for example, a user or an administrator, employee, or other staff member of the network-accessible system that is associated with the administrator system 106). Thus, the image may be a part of the existing listing. The feature extractor module 152 may extract color, shape, and/or texture features from the image as described above. The extracted features may be forwarded to the classifier module 154. The feature extractor module 152 and the classifier module 154 may operate as described above to identify attributes of an item depicted in an image.

The classifier module 154 may compare attributes outputted by the linear classifier with the attributes provided in the item description stored in the catalog database 142. The classifier module 154 may identify attributes that conflict and attributes outputted by the linear classifier that are not included in the item description. The classifier module 154 may use these results to validate (e.g., if there are no conflicts and no missing attributes) the item description or to invalidate (e.g., if there are conflicts or missing attributes) the item description. Alternatively or in addition, the classifier module 154 may then provide suggested revisions to the user device 102 associated with the user that posted the listing. The revisions may include the attributes outputted by the linear classifier that conflict with the attributes provided in the item description (and a suggestion to remove and replace the conflicting attributes), if any, and the attributes outputted by the linear classifier that are not included in the item description (and a suggestion to add these attributes), if any.

In an embodiment, the attributes outputted by the linear classifier are incorporated without any feedback from the user. For example, the item description may be populated with the attributes and/or auto-corrected to include the attributes (and remove any conflicting attributes). The catalog database 142 may be updated to include the image (if not already stored) and the updated item description. In another embodiment, the user associated with the user device 102 may provide feedback on the attributes outputted by the linear classifier. For example, the user may verify that the attributes outputted by the linear classifier or suggested attribute revisions are accurate. The user may also provide additional attributes that were not included in the identified attributes or correct any recommended revisions to the attributes that are incorrect. In some cases, the user may label the image to identify additional attributes. The feedback may be provided to the classifier training module 150 such that the training of the linear classifier can be updated. Alternatively or in addition, the feedback (e.g., the labeled image) may be stored in the training image database 144. Once the user has provided feedback, the item description may be updated to incorporate the feedback. The attribute verification system 104 may update the catalog database 142 to include the image (if not already stored) and the updated item description.

The attribute verification system 104 (e.g., the classifier module 154) may generate a confidence score that is associated with each identified attribute (e.g., a score that indicates the level of confidence that the linear classifier has that the image includes an item with the respective attribute). The confidence score may be used to determine whether the item description is auto-corrected or whether feedback from the user is requested. For example, if the confidence score associated with an attribute is below a threshold value, then the attribute verification system 104 may request feedback from the user regarding the identified attribute. Likewise, if the confidence score associated with an attribute is above a threshold value, then the attribute verification system 104 may auto-correct the item description using the identified attribute. In some embodiments, the attribute verification system 104 auto-corrects the item description for some attributes (e.g., those with a confidence score above a threshold value) and requests feedback from the user for other attributes (e.g., those with a confidence score below the threshold value).

In a further embodiment, the classifier module 154 or a recommendation module within the attribute verification system 104 (not shown) provides the user with one or more items that may be related to an item that the user has selected or is viewing. For example, a user may identify an item that is of interest, but may wish to search for similar items (e.g., other items that have similar colors, shapes, and/or textures). The classifier module 154 or the recommendation module may use a latent variable model and the features extracted from an image (e.g., as provided by the feature extractor module 152) to identify attributes in an item in an image, where the identified attributes can be used to generate a representation of the item in the image. An item in the image may have a large set of attributes. To facilitate comparing different items, the latent variable model may reduce the dimensionality of the attributes in a latent variable space to a smaller subset of attributes. The latent variable model may be represented as follows:

$$x^{(m)} = \zeta^{(m)}(z) + \rho^{(m)}(z^{(m)}) + \epsilon^{(m)} \quad (3)$$

where m refers to an attribute, $x^{(m)}$ refers to a multivariate variable that is an attribute, z represents the variability of attributes that are common across certain items (e.g., luxury goods may use certain materials, whereas sporting goods may not use such materials), $z^{(m)}$ represents the variability of attributes that are not shared or specific to certain items (e.g., color), $\epsilon^{(m)}$ represents noise that may be introduced by variability that is neither shared across attributes nor specific to an attribute, $\zeta^{(m)}$ represents the mappings from the shared latent variable space to the actual attributes, and $\rho^{(m)}$ represents the mappings from an attribute specific latent variable space to an attribute space.

The classifier module 154 or the recommendation module may repeat the process of generating a representation of an item in an image for some or all of the items for which images are stored in the catalog database 142. The classifier module 154 or the recommendation module may store each of the representations in a lower dimensional space (e.g., in a database associated with the classifier module 154 or the recommendation module, not shown) such that the representations of items with similar colors, shapes, and/or textures are stored near each other (e.g., are neighbors in the lower dimensional space) and/or are stored with parameters that indicate the proximity (in distance) of one representation with the other representations. Once a user selects a first item, the classifier module 154 or the recommendation module may parse the lower dimensional space to identify other items that have representations that neighbor the representation of the first item (e.g., within a distance below a threshold value). The classifier module 154 or the recommendation module may transmit an identification of these other items to the user device 102 as items that are similar to the first item.

As mentioned above, the attribute verification system 104 may be provided as a service. A third party could provide an image to the attribute verification system 104 and receive a list of attributes using any of the processes described above. The third party may use the list of attributes for any number of purposes. For example, the third party may include the attributes in an article that reviews the item in the image. As another example, the third party may use the service to identify an item and the item's features in an otherwise unlabeled image.

System Components in an Example Environment

Figure 1B:
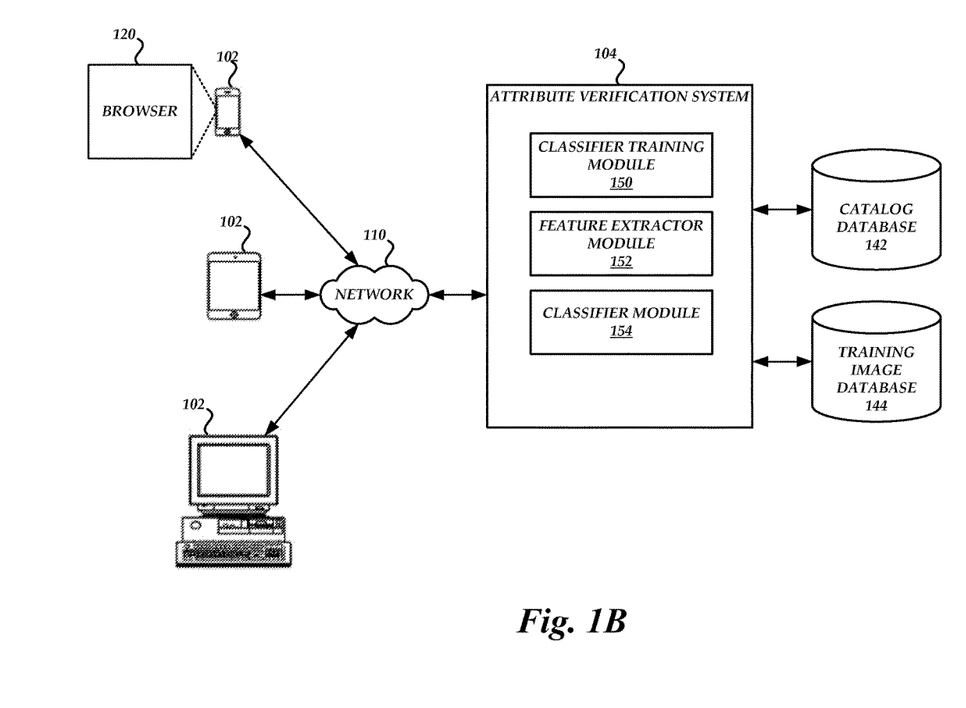
FIG. 1B illustrates a catalog item attribute verification environment with the attribute verification system of FIG. 1A according to one embodiment.

FIG. 1B illustrates a catalog item attribute verification environment with the attribute verification system 104 of FIG. 1A according to one embodiment. The environment shown in FIG. 1B may be one of many possible environments in which the attribute verification system 104 can be implemented. As illustrated in FIG. 1B, the environment includes various user devices 102 and the attribute verification system 104. The attribute verification system 104 may include multiple distinct computers or machines, some of which may be assigned to different attribute identification tasks than others. The system components may communicate with each other via one or more communication networks 110. The network 110 may be a publicly accessible network of linked networks, possibly operated by various distinct parties, such as the Internet. In other embodiments, the network 110 may include a private network, personal area network, local area network, wide area network, cable network, satellite network, cellular telephone network, etc. or combination thereof, each with access to and/or from the Internet.

The environment may include any number of distinct user devices 102. In addition, multiple (e.g., two or more) attribute verification systems 104 may be used. For example, separate attribute verification systems 104 may be located so that they are close (in either a geographical or networking sense) to groups of current or potential user devices 102. In such a configuration, a user device 102 may receive an attribute identification via the attribute verification system 104 to which it is closest, rather than all user devices 102 receiving attribute identifications via a single attribute verification system 104.

The user devices 102 can include a wide variety of computing devices, including personal computing devices, terminal computing devices, laptop computing devices, tablet computing devices, electronic reader devices, mobile devices (e.g., mobile phones, media players, handheld gaming devices, etc.), wearable devices with network access and program execution capabilities (e.g., "smart watches" or "smart eyewear"), wireless devices, set-top boxes, gaming consoles, entertainment systems, televisions with network access and program execution capabilities (e.g., "smart TVs"), and various other electronic devices and appliances. Individual user devices 102 may execute a browser application to communicate via the network 110 with other computing systems, such as the attribute verification system 104, in order to request and/or receive attribute identifications. The user devices 102 may execute a browser application 120 that can be used by a user (or administrator) to access a page that displays an item listing and identifies attributes to include in the item listing.

The attribute verification system 104 can be a computing system configured to revise an existing item description, suggest revisions to an existing item description, recommend attributes to include in a new item description, identify items that may be related to a selected or viewed item, determine an item category that a new listing should be placed under, and/or generally provide a list of identified attributes based on an analysis of an image. For example, the attribute verification system 104 can be a physical server or group of physical servers that may be accessed via the network 110.

As described above with respect to FIG. 1A, the attribute verification system 104 may include various modules, components, data stores, and the like to provide the analysis and attribute identification functionality described herein. For example, the attribute verification system 104 may include the classifier training module 150, the feature extractor module 152, and the classifier module 154. In some embodiments, the attribute verification system 104 may include additional or fewer modules than those shown in FIG. 1B. The attribute verification system 104 may be part of a larger electronic catalog system or site that provides functionality for users to, e.g., interactively browse, search for, review, rate, tag, purchase, sell and obtain recommendations of catalog items; examples of such systems are described, e.g., in U.S. Pat. Nos. 7,685,074, 7,472,077 and 8,122,020, the disclosures of which are hereby incorporated by reference.

The classifier training module 150, the feature extractor module 152, and/or the classifier module 154 can operate in parallel and for multiple users at the same time. For example, the verification of attributes listed in an item description may be requested from unique user devices 102 for different listings and the components of the attribute verification system 104 can verify the listed attributes simultaneously or nearly simultaneously for the unique user devices 102 in "real-time," where "real-time" may be based on the perspective of the user. The generation and verification of attributes may be considered to occur in real time if, for example, the delay is sufficiently short (e.g., less than a few seconds) such that the user typically would not notice a processing delay. Real-time may also be based on the following: the attribute verification system 104 can verify listed attributes for a first user at the same time or at nearly the same time (e.g., within a couple seconds) as a verification of listed attributes is performed for a second user; the attribute verification system 104 can verify listed attributes simultaneously or nearly simultaneously as instantaneously as possible, limited by processing resources, available memory, network bandwidth conditions, and/or the like; the attribute verification system 104 can verify listed attributes simultaneously or nearly simultaneously based on a time it takes the hardware components of the attribute verification system 104 to process data; the attribute verification system 104 can verify listed attributes simultaneously or nearly simultaneously immediately as data is received (instead of storing, buffering, caching, or persisting data as it is received and processing the data later on); the attribute verification system 104 can verify listed attributes simultaneously or nearly simultaneously by transforming data without intentional delay, given the processing limitations of the attribute verification system 104 and other systems, like the user devices 102, and the time required to accurately receive and/or transmit the data; the attribute verification system 104 can verify listed attributes simultaneously or nearly simultaneously by processing or transforming data fast enough to keep up with an input data stream; etc.

As described above, in some embodiments, the catalog database 142 is located external to the attribute verification system 104. For example, the catalog database 142 may be stored and managed by a separate system or server and may be in communication with the attribute verification system 104 via a direct connection or an indirect connection (e.g., via a network, such as the network 110). In other embodiments, not shown, the catalog database 142 is located within the attribute verification system 104.

The training image database 144 may also be located external to the attribute verification system 104. For example, the training image database 144 may be stored and managed by a separate system or server and may be in communication with the attribute verification system 104 via a direct connection or an indirect connection (e.g., via a network, such as the network 110). In other embodiments, not shown, the training image database 144 is located within the attribute verification system 104.

Example Process for Verifying an Attribute

Figure 2:
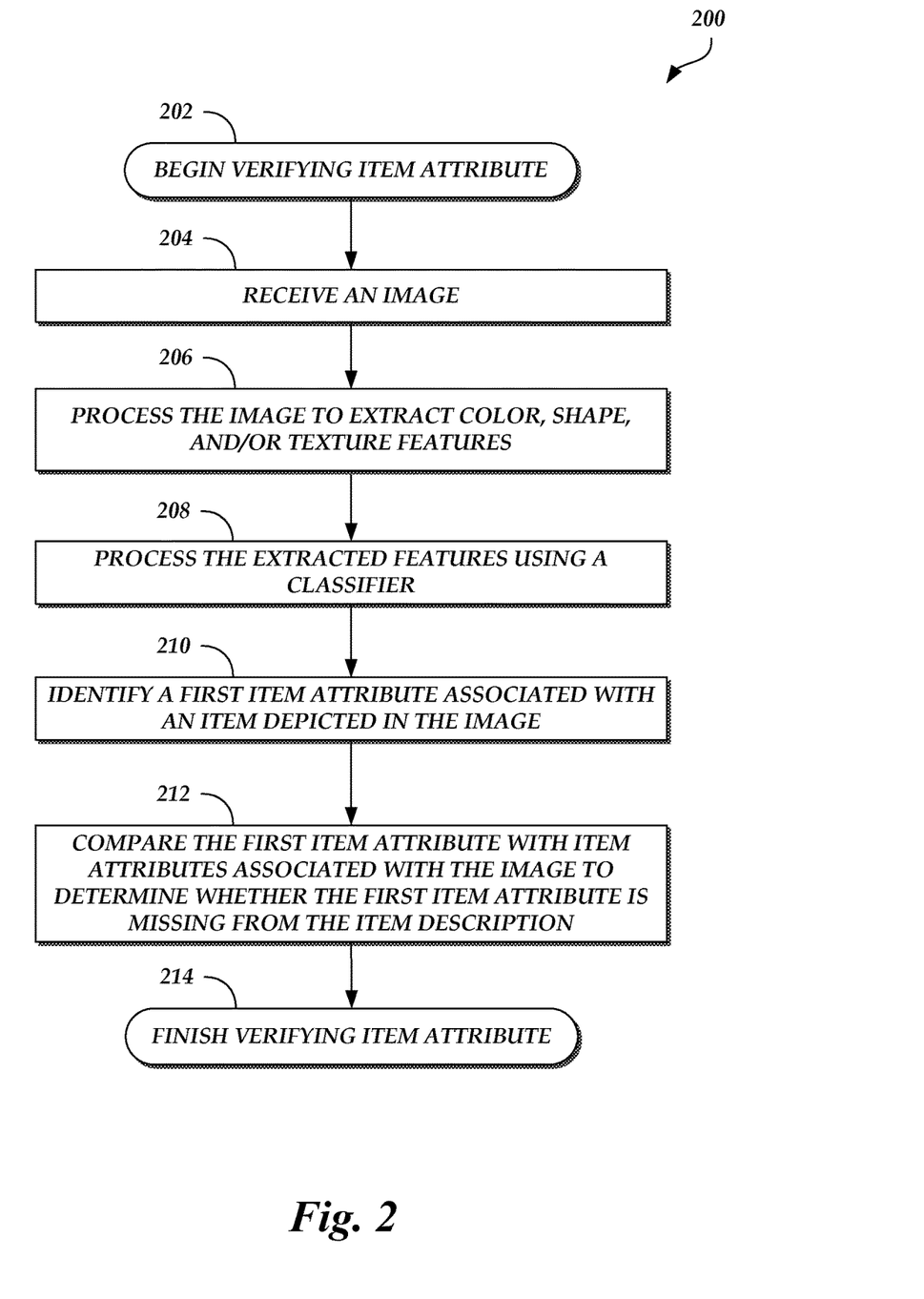
FIG. 2 illustrates a process that may be used by an attribute verification system to identify an attribute of an item using artificial intelligence.

FIG. 2 illustrates a process 200 that may be used by the attribute verification system 104 to identify an attribute of an item using artificial intelligence. As an example, the attribute verification system 104 of FIGS. 1A-1B can be configured to implement the item attribute verification process 200. The item attribute identification process 200 begins at block 202.

At block 204, an image is received. The image may be received from the catalog database 142 for an existing listing. Alternatively, the image may be received from a user device as a user associated with the user device attempts to generate a listing for an item to be posted for viewing in a network-accessible system. The image may also be received as a user provides a new picture for an existing listing.

At block 206, the image is processed to extract color, shape, and/or texture features. For example, the item attribute verification process 200 may use computer vision image processing or pre-processing techniques to extract the color, shape, and/or texture features.

At block 208, the extracted features are processed using a classifier. The classifier may output one or more attributes based on the processing of the extracted features. In an embodiment, the classifier is a linear classifier and is trained using images that have been labeled to identify one or more attributes of the item depicted in the respective image.

At block 210, a first item attribute associated with an item depicted in the image is identified. The first item attribute may be identified by the classifier based on the processing of the extracted features. In some embodiments, the classifier identifies a plurality of item attributes.

At block 212, the first item attribute is compared with item attributes associated with the image to determine whether the first item attribute is missing from the item description. If the first item attribute is missing from the item description, the item attribute verification process 200 may update the item description to include the first item attribute. After the comparison of the first item attribute with item attributes associated with the image, the item attribute verification process 200 may be complete, as shown in block 214.

Example Network Page Viewed on a User Device

Figure 3A:
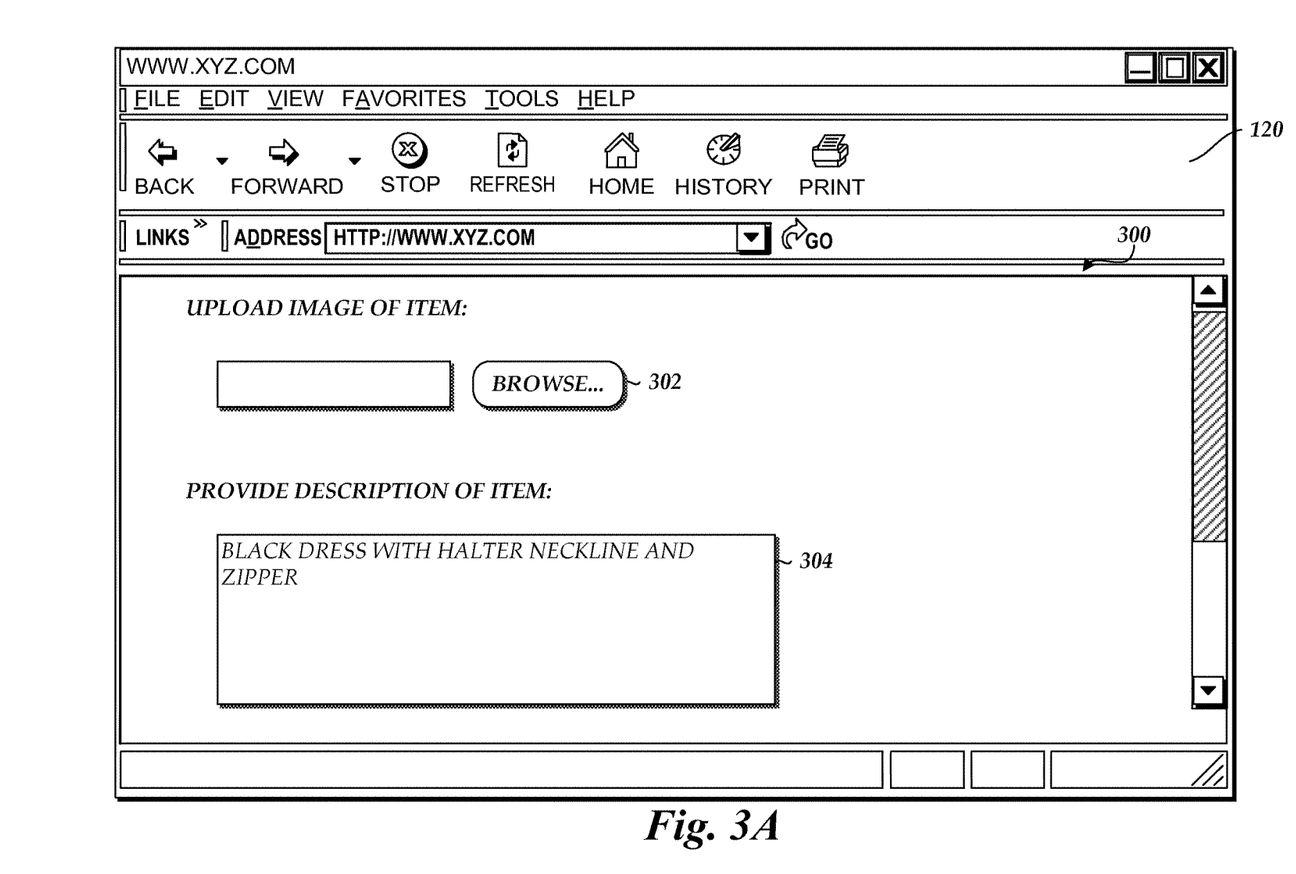
FIGS. 3A-3B illustrate an example of a representation of a network page displayed on a user device, such as the user device of FIGS. 1A-1B.
Figure 3B:
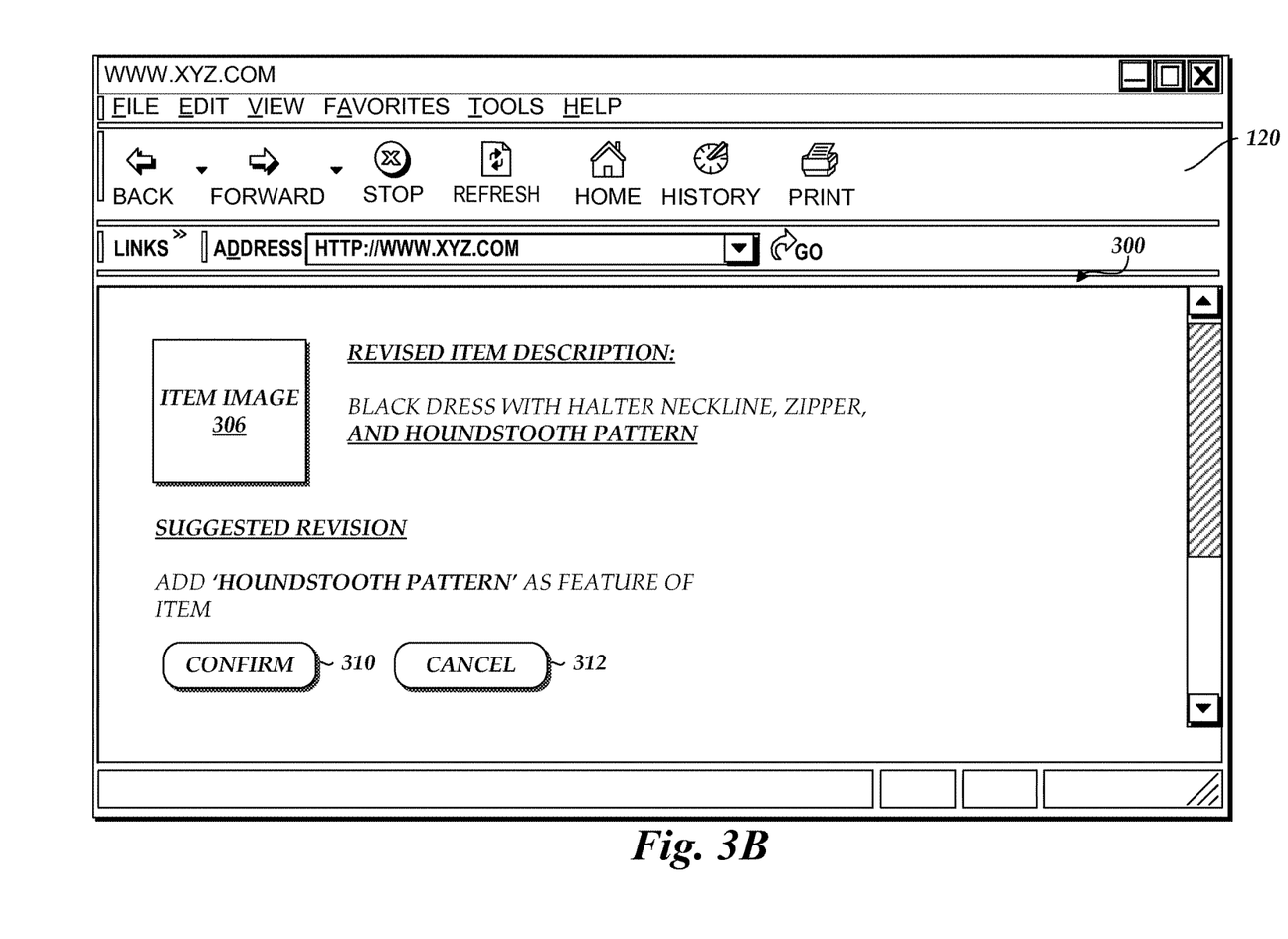

FIGS. 3A-3B illustrate an example of a representation of a network page 300 displayed on a user device, such as the user device 102. The network page 300 may be displayed within the user interface of the browser application 120 of the user device 102. As illustrated in FIG. 3A, the network page 300 requests a user to upload an image. For example, the user may choose an image saved locally to the user device 102 using browse button 302. The user may choose to upload an image to generate a new item listing or to add a new image to an existing item listing. The user may also enter or revise an item description in field 304. For example, the user may enter or revise the item description such that it reads "black dress with halter neckline and zipper."

Upon uploading the image, the attribute verification system 104 may process the image using the feature extractor module 152 and the linear classifier. The attribute verification system 104 may output a list of possible attributes based on the processing. In this example, the attribute verification system 104 may determine that the item is a black dress with a halter neckline, a zipper, and a houndstooth pattern. The item description provided by the user, however, does not mention the houndstooth pattern. Thus, the attribute verification system 104 may automatically make changes to the item description or request verification from the user before making changes. For example, as illustrated in FIG. 3B, the attribute verification system 104 may revise the item description, identify the changes made, and request the user to confirm the changes by selecting confirm button 310 or to disregard the suggested changes by selecting cancel button 312.

The attribute verification system 104 may receive feedback from the user after the user confirms or cancels the suggested changes. For example, if the user cancels the suggested changes, then the attribute verification system 104 may determine that the results were semi-accurate or not accurate and provide this feedback to the classifier training module 150 so that the training of the linear classifier can be updated.

Figure 4:
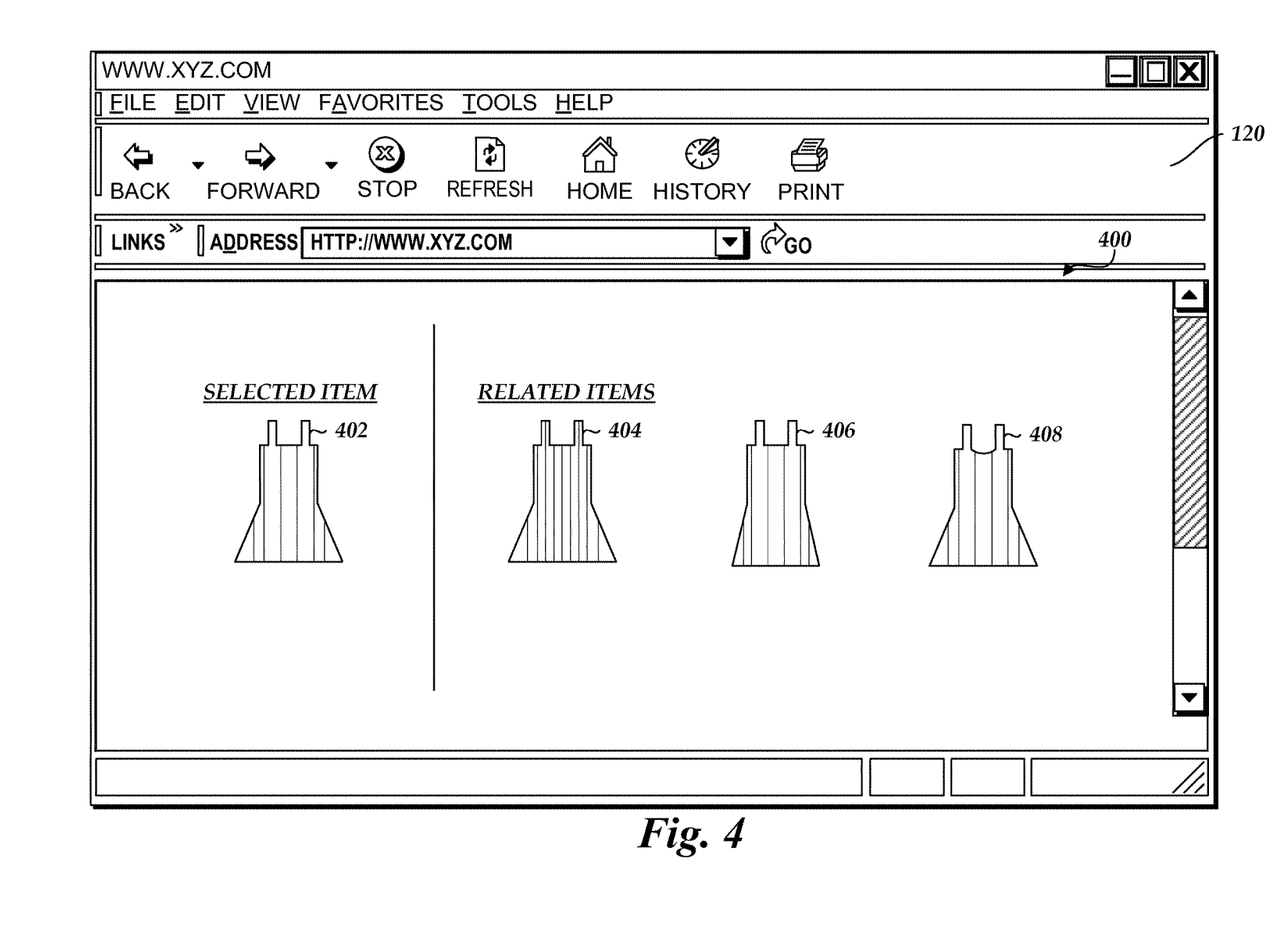
FIG. 4 illustrates another example of a representation of a network page displayed on a user device, such as the user device of FIGS. 1A-1B.

FIG. 4 illustrates another example of a representation of a network page 400 displayed on a user device, such as the user device 102. The network page 400 may be displayed within the user interface of the browser application 120 of the user device 102. As illustrated in FIG. 4, the network page 400 displays an item 402 selected by the user. For example, the item 402 may be a dress with stripes. The user may submit a request to view other items that are similar to the item 402. Alternatively, items similar to the item 402 may be automatically provided to the user.

The attribute verification system 104 may, using the latent variable model, identify one or more items that are related to the item 402. For example, the attribute verification system 104 may identify items 404, 406, and 408 as items that are similar to item 402. The attribute verification system 104 may identify items 404, 406, and 408 as similar to item 402 because the representations of items 404, 406, and 408 may neighbor the representation of item 402 in the lower dimensional space. As an example, item 404 may be similar to item 402 because item 404 is also a dress with the same shape and with stripes (with the stripes being more numerous). Item 406 may be similar to item 402 because item 406 is also a dress with stripes (with the stripes being less numerous) and with a similar shape (e.g., the dress of item 406 may be narrower than the dress of item 402). Item 408 may be similar to item 402 because item 408 is also a dress with the same shape and stripes, but with a curved neckline rather than a flat neckline. The items 404, 406, and 408 may be ordered such that the most related item is listed first (e.g., item 404 in this example).

Additional Embodiments

The attribute verification system 104 of FIGS. 1A-1B may be a single computing device, or it may include multiple distinct computing devices, such as computer servers, logically or physically grouped together to collectively operate as a server system. The components of the attribute verification system 104 can each be implemented in application-specific hardware (e.g., a server computing device with one or more ASICs) such that no software is necessary, or as a combination of hardware and software. In addition, the modules and components of the attribute verification system 104 can be combined on one server computing device or separated individually or into groups on several server computing devices. In some embodiments, the attribute verification system 104 may include additional or fewer components than illustrated in FIGS. 1A-1B.

In some embodiments, the features and services provided by the attribute verification system 104 may be implemented as web services consumable via the communication network 110. In further embodiments, the attribute verification system 104 is provided by one more virtual machines implemented in a hosted computing environment. The hosted computing environment may include one or more rapidly provisioned and released computing resources, which computing resources may include computing, networking and/or storage devices. A hosted computing environment may also be referred to as a cloud computing environment.

Terminology

All of the methods and tasks described herein may be performed and fully automated by a computer system. The computer system may, in some cases, include multiple distinct computers or computing devices (e.g., physical servers, workstations, storage arrays, cloud computing resources, etc.) that communicate and interoperate over a network to perform the described functions. Each such computing device typically includes a processor (or multiple processors) that executes program instructions or modules stored in a memory or other non-transitory computer-readable storage medium or device (e.g., solid state storage devices, disk drives, etc.). The various functions disclosed herein may be embodied in such program instructions, and/or may be implemented in application-specific circuitry (e.g., ASICs or FPGAs) of the computer system. Where the computer system includes multiple computing devices, these devices may, but need not, be co-located. The results of the disclosed methods and tasks may be persistently stored by transforming physical storage devices, such as solid state memory chips and/or magnetic disks, into a different state. In some embodiments, the computer system may be a cloud-based computing system whose processing resources are shared by multiple distinct business entities or other users.

Depending on the embodiment, certain acts, events, or functions of any of the processes or algorithms described herein can be performed in a different sequence, can be added, merged, or left out altogether (e.g., not all described operations or events are necessary for the practice of the algorithm). Moreover, in certain embodiments, operations or events can be performed concurrently, e.g., through multi-threaded processing, interrupt processing, or multiple processors or processor cores or on other parallel architectures, rather than sequentially.

The various illustrative logical blocks, modules, routines, and algorithm steps described in connection with the embodiments disclosed herein can be implemented as electronic hardware (e.g., ASICs or FPGA devices), computer software that runs on general purpose computer hardware, or combinations of both. To clearly illustrate this interchangeability of hardware and software, various illustrative components, blocks, modules, and steps have been described above generally in terms of their functionality. Whether such functionality is implemented as specialized hardware versus software running on general-purpose hardware depends upon the particular application and design constraints imposed on the overall system. The described functionality can be implemented in varying ways for each particular application, but such implementation decisions should not be interpreted as causing a departure from the scope of the disclosure.

Moreover, the various illustrative logical blocks and modules described in connection with the embodiments disclosed herein can be implemented or performed by a machine, such as a general purpose processor device, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor device can be a microprocessor, but in the alternative, the processor device can be a controller, microcontroller, or state machine, combinations of the same, or the like. A processor device can include electrical circuitry configured to process computer-executable instructions. In another embodiment, a processor device includes an FPGA or other programmable device that performs logic operations without processing computer-executable instructions. A processor device can also be implemented as a combination of computing devices, e.g., a combination of a DSP and a microprocessor, a plurality of microprocessors, one or more microprocessors in conjunction with a DSP core, or any other such configuration. Although described herein primarily with respect to digital technology, a processor device may also include primarily analog components. For example, some or all of the rendering techniques described herein may be implemented in analog circuitry or mixed analog and digital circuitry. A computing environment can include any type of computer system, including, but not limited to, a computer system based on a microprocessor, a mainframe computer, a digital signal processor, a portable computing device, a device controller, or a computational engine within an appliance, to name a few.

The elements of a method, process, routine, or algorithm described in connection with the embodiments disclosed herein can be embodied directly in hardware, in a software module executed by a processor device, or in a combination of the two. A software module can reside in RAM memory, flash memory, ROM memory, EPROM memory, EEPROM memory, registers, hard disk, a removable disk, a CD-ROM, or any other form of a non-transitory computer-readable storage medium. According to one example, a storage medium can be coupled to the processor device such that the processor device can read information from, and write information to, the storage medium. In the alternative, the storage medium can be integral to the processor device. The processor device and the storage medium can reside in an ASIC. The ASIC can reside in a user terminal. In the alternative, the processor device and the storage medium can reside as discrete components in a user terminal.

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without other input or prompting, whether these features, elements and/or steps are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

Disjunctive language such as the phrase "at least one of X, Y, Z," unless specifically stated otherwise, is otherwise understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

While the above detailed description has shown, described, and pointed out novel features as applied to various embodiments, it can be understood that various omissions, substitutions, and changes in the form and details of the devices or algorithms illustrated can be made without departing from the spirit of the disclosure. As can be recognized, certain embodiments described herein can be embodied within a form that does not provide all of the features and benefits set forth herein, as some features can be used or practiced separately from others. The scope of certain embodiments disclosed herein is indicated by the appended claims rather than by the foregoing description. All changes which come within the meaning and range of equivalency of the claims are to be embraced within their scope.

What is claimed is:

1. A system for analyzing an image using artificial intelligence comprising:
a training image database comprising a plurality of images of catalog items and including annotations associated with the images, the annotations including labels specifying attributes of the catalog items depicted in the corresponding images; and
a computer system configured to:
train a classifier using the images and associated annotations, wherein training the classifier comprises generating, based on the images and associated annotations, classification data that is distinct from the images and associated annotations;
receive a user submission specifying a first image and an item description associated with the first image, wherein the item description comprises item attributes;
process the first image to extract at least a color feature, a shape feature, or a texture feature;
process at least the color feature, the shape feature, or the texture feature using the trained classifier, including the classification data;
identify a first item attribute associated with an item depicted in the first image based on the processing of at least the color feature, the shape feature, or the texture feature;
determine whether the item description matches the first image at least partly by comparing the first item attribute with the item attributes in the item description; and
when a determination is made that the first item attribute is not included in the item description, updating the item description to include the first item attribute or generating a recommendation to add the first item attribute to the item description.

2. The system of claim 1, wherein the computer system is further configured to:
generate a vector of color values based on an analysis of the first image;
generate one or more visual words using the vector of color values;
compute a histogram of the generated one or more visual words; and
compute a non-linear transformation of the computed histogram to extract the color feature.

3. The system of claim 1, wherein the computer system is further configured to:

downscale the first image; and
compute a histogram of oriented gradients on the downscaled first image to extract the shape feature.

4. The system of claim 1, wherein the computer system is further configured to use local image statistics to extract the texture feature.

5. The system of claim 1, wherein the plurality of images includes a negative sample image having a label indicating that the negative sample image does not include a particular attribute, and the computer system is programmed to use the negative sample image to train the classifier.

6. The system of claim 1, wherein at least one of the annotations includes a label specifying an image location of a particular attribute.

7. The system of claim 1, wherein the computer system is further configured to:
transmit, to a user device, a request to verify whether the first item attribute is associated with the item in the first image;
receive, from the user device, a verification that the first item attribute is associated with the item in the first image; and
update, in response to a determination that the first item attribute is not included in the item description and in response to receipt of the verification, the item description to include the first item attribute.

8. The system of claim 1, wherein the classifier is a linear classifier.

9. The system of claim 1, wherein the computer system is further configured to:
generate a user interface that comprises the item description associated with the first image and a suggested revision to the item description, wherein the suggested revision is based on the first item attribute, and wherein the user interface further comprises functionality to allow a user to accept or decline the suggested revision; and
transmit the user interface to a user device for display.

10. The system of claim 1, wherein the classification data comprises a weight vector generated for a class of attributes.

11. The system of claim 10, wherein the computer system is programmed to generate the weight vector using a model training equation.

12. A computer image analysis process, comprising:
training a classifier with a plurality of annotated images of catalog items, the annotated images including labels specifying attributes of the catalog items depicted in the corresponding images, wherein training the classifier comprises generating classification data that is separate from the annotated images, wherein the plurality of annotated images includes a negative sample image having a label specifying that the negative sample image does not include a particular attribute, and wherein training the classifier comprises using the negative sample image to train the classifier to identify images that do not depict the particular attribute;
receiving a user submission of a catalog item listing, the submission specifying an image of a catalog item and an item description of the catalog item; and
determining whether the item description accurately describes the catalog item by a process that comprises:
extracting features of the image;
processing the extracted features with the trained classifier, including the classification data, wherein the trained classifier outputs an identification of attributes of the catalog item depicted in the image; and comparing the identification of attributes to the item description;

the method performed programmatically by a computing system that comprises one or more computing devices.

13. The process of claim 12, wherein at least one of the annotated images used to train the classifier includes a label specifying an image location of a particular attribute.

14. The process of claim 12, wherein the classification data comprises a weight vector generated for a class of attributes.

15. The process of claim 12, wherein training the classifier comprises generating the weight vector using a training equation.

16. The process of claim 12, further comprising outputting to a user an indication of a conflict between the item description and the identification of attributes output by the trained classifier.

17. The process of claim 12, further comprising outputting to a user an indication that an attribute identified by the trained classifier is not included in the item description.

* * * * *